(12) United States Patent
Chen

(10) Patent No.: US 10,447,820 B2
(45) Date of Patent: Oct. 15, 2019

(54) SYSTEM INTERFACING ARCHITECTURE

(71) Applicant: IBASE TECHNOLOGY INC., Taipei (TW)

(72) Inventor: You-Nan Chen, Taipei (TW)

(73) Assignee: IBASE TECHNOLOGY INC., Taipei (TW)

( * ) Notice: Subject to any disclaimer, the term of this patent is extended or adjusted under 35 U.S.C. 154(b) by 99 days.

(21) Appl. No.: 15/825,452

(22) Filed: Nov. 29, 2017

(65) Prior Publication Data

US 2019/0068756 A1 Feb. 28, 2019

(30) Foreign Application Priority Data

Aug. 22, 2017 (TW) .............................. 106128370 A

(51) Int. Cl.
| | |
|---|---|
| *H04L 29/06* | (2006.01) |
| *H04L 29/08* | (2006.01) |
| *G06F 9/455* | (2018.01) |
| *A63F 13/80* | (2014.01) |
| *G07F 17/32* | (2006.01) |
| *A63F 13/73* | (2014.01) |
| *A63F 13/335* | (2014.01) |

(Continued)

(52) U.S. Cl.
CPC ............ *H04L 67/42* (2013.01); *A63F 13/335* (2014.09); *A63F 13/71* (2014.09); *A63F 13/73* (2014.09); *A63F 13/77* (2014.09); *A63F 13/80* (2014.09); *G07F 17/32* (2013.01); *H04L 67/1002* (2013.01); *H04L 69/16* (2013.01); *G06F 2009/45595* (2013.01)

(58) Field of Classification Search
CPC ...... H04L 67/42; H04L 67/1002; H04L 69/16; A63F 13/80; G06F 2009/45595
See application file for complete search history.

(56) References Cited

U.S. PATENT DOCUMENTS 9,225,799 B1 * 12/2015 Dong .................. G06F 3/14
9,300,720 B1 * 3/2016 Qiu .................... G06F 9/45504
(Continued)

FOREIGN PATENT DOCUMENTS

| CN | 103885814 B | * | 5/2017 |
| CN | 104740872 B | * | 6/2018 |

*Primary Examiner* — Ninos Donabed
(74) *Attorney, Agent, or Firm* — Lin & Associates Intellectual Property, Inc.

(57) ABSTRACT

Disclosed is a system interfacing architecture, and includes a system server, a communication network, and a plurality of client devices. The system server includes a virtual machine and performs a server operation, and each of the client devices executes a respective client operation. The client devices running an android operation system are connected to the system server running an X86 windows operation system by TCP/IP through the communication network. The server operation includes steps of logging in, entering regional disk, invoking the virtual machine, linking to the network, and executing a server window application. The client operation includes steps of executing a specific android application package, keying in an account number, displaying a window environment, and performing a client window application. In particular, the client device employs the client window application to communicate with the system server running the client window application for mutual operation.

4 Claims, 2 Drawing Sheets

(51) Int. Cl.
*A63F 13/77* (2014.01)
*A63F 13/71* (2014.01)

(56) References Cited

U.S. PATENT DOCUMENTS

| | | | |
|---|---|---|---|
| 9,444,912 B1* | 9/2016 | Chen | H04L 69/08 |
| 2011/0296411 A1* | 12/2011 | Tang | G06F 9/45545 |
| | | | 718/1 |
| 2014/0379776 A1* | 12/2014 | Gokul | G06Q 30/02 |
| | | | 709/201 |
| 2015/0094150 A1* | 4/2015 | Gregory | A63F 13/12 |
| | | | 463/42 |
| 2016/0210130 A1* | 7/2016 | Sankaranarasimhan | |
| | | | G06F 8/61 |
| 2017/0026385 A1* | 1/2017 | Zarkesh | H04L 63/107 |
| 2017/0032050 A1* | 2/2017 | Kol | G06F 3/0482 |
| 2018/0218362 A1* | 8/2018 | Ng | G06F 8/34 |

\* cited by examiner

SYSTEM INTERFACING ARCHITECTURE

CROSS-REFERENCE TO RELATED APPLICATION

This application claims the priority of Taiwanese patent application No. 106128370, filed on Aug. 22, 2017, which is incorporated herewith by reference.

BACKGROUND OF THE INVENTION

1. Field of the Invention

The present invention generally relates to a system interfacing architecture, and more specifically to a system interfacing architecture for integrating two OS subsystems (server/client) running different operation systems, respectively, a client device running a client window application to mutually communicate with a system server running a server window application through a communication network and a TCP/IP protocol, thereby greatly reducing operation loading of the system server, and achieving smooth coalescence and integration of the two different OS subsystems.

2. The Prior Arts

As network is widely used, the on-line game becomes more popular, and the related technique also gets mature. In the prior arts, a server/client architecture is usually employed, and generally comprises one server owned by the vendor, which serves many client devices like personal computers connected to the server through the network. The user of the client device can acquire and display the current status and result of the game transferred by the server such as the points, remaining fighting power, and challenging stage of other players in a survival game, or advantage distance, collected reward, and rank points of other racers in a car racing game. For the gamble game, it surely shows bet, roulette points, card game (bridge) points, and mahjong tiles.

Taking the gamble game as an illustrative example, as smart phones are prevalently used, the vendors have constantly developed various mobile gamble game applications for free download. A plurality of users are allowed to connect to the same gamble game, and the server of the vendor is configured as the banker for gambling. It should be noted that the system operation (OS) run by the ordinary mobile phone is an android OS, but the OS of the server is often an X86 windows OS. As a result, some appropriate mechanism for data conversion is needed for mutual transfer of data among the server and the mobile phone, and the primary operation loading for data conversion is performed by the server so as to prevent the mobile phone from slowing down other applications.

However, one shortcoming in the prior arts is that the server always runs with a heavy loading, and the operation speed of the server gamble application seriously slows down. Unfortunately, the user has less intention for the gamble game because of serious lag, little fun and poor sense of reality.

Therefore, it is greatly needed to provide a new system interfacing architecture for integrating two OS subsystems (server/client) running different operation systems, respectively, a client device running a client window application to mutually communicate with a system server running a server window application, thereby greatly reducing operation loading of the system server, achieving smooth coalescence and integration of the two different OS subsystems, and overcoming the above problems in the prior arts.

SUMMARY OF THE INVENTION

The primary objective of the present invention is to provide a system interfacing architecture, comprising a system server, a communication network, and a plurality of client devices. The communication network is implemented by a wireless network or a wire network. The system server executes a server operation under a X86 windows operation system for linking to the communication network through a communication protocol of TCP/IP. Each client device is provided with an ARM-based processor for executing a client operation under an android operation system to link to the communication network through the TCP/IP communication protocol. In addition, the client device is implemented by a mobile phone, a tablet computer, or a terminal running the android operation system.

The above server operation comprises steps of a superuser of the system server logging in, entering a regional disk of the system server 1, invoking the virtual machine to hook up the X86 windows operation system, the virtual machine linking to the network via the TCP/IP, and executing a server window application.

Moreover, the client operation includes steps of executing a specific android application package (APK) under the android operation system, a user of the client device keying in an account number for logging in, turning on and displaying a window environment, the user selecting a client window application, and then performing the client window application to implement a mutual operation with the system server running the server window application through the communication network for mutually transferring data or information.

Thus, the client device running the client window application and the system server running the server window application can mutually communicate with each other, and particularly, a handshake mechanism is used for mutual communication between the client device and the system server.

The system interfacing architecture of the present invention is a specific architecture of server/client running different operation systems, and greatly improves operation efficiency by reducing operation loading of the system server, thereby achieving smooth coalescence and integration of two different OS subsystems.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
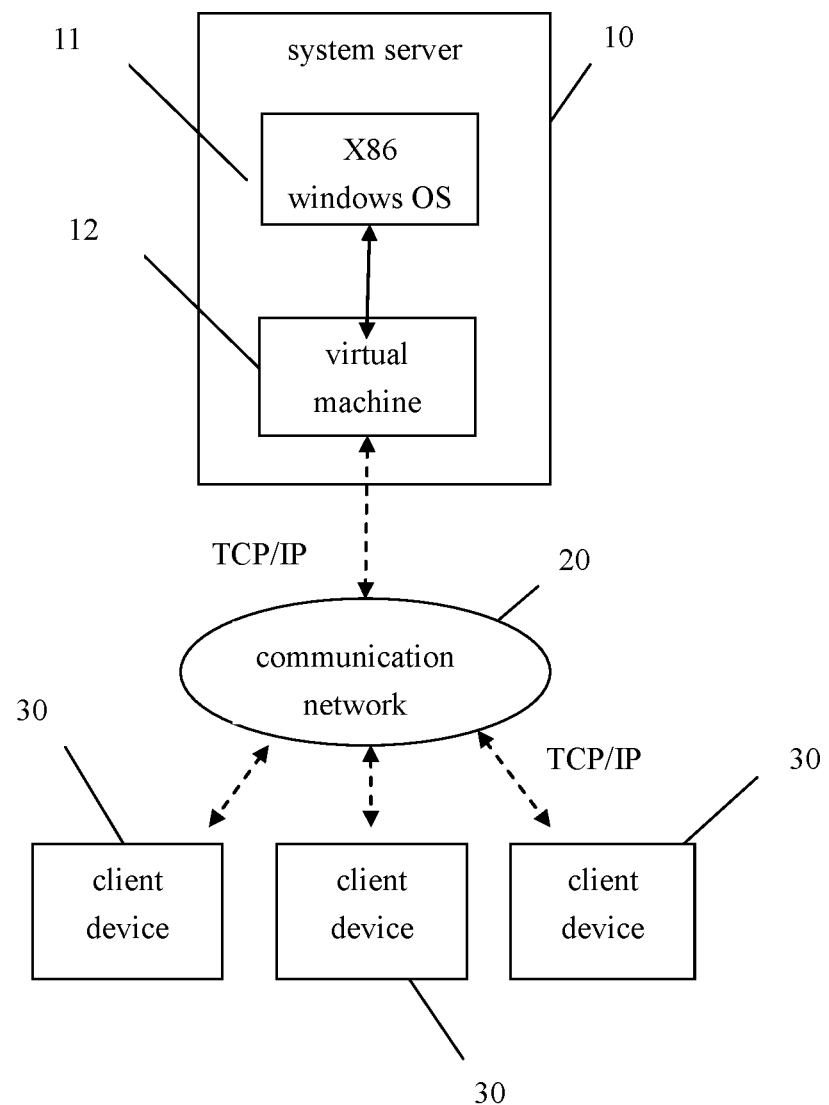
FIG. 1 is a view showing the system interfacing architecture according to the embodiment of the present invention.

Please refer to FIG. 1 illustrating the system interfacing architecture according to the embodiment of the present invention. As shown in FIG. 1, the system interfacing architecture of the present invention generally comprises a system server 10, a communication network 20, and a plurality of client devices 30. The system server 10 and the client devices 30 are connected to the communication network 20 for mutual connection. Thus, the user employs the client device 30 to link to the system server 10 through the communication network 20 for performing a specific operation such as on-line game or gamble game.

The system server 10 runs a first operation system (OS), and each of the client devices 30 executes a second OS different from the first OS. For instance, the first OP is an X86 windows OS and the second OS is an android OS. Further, the communication network 20 is implemented by a wireless or wire network. It should be noted that all the technical aspects of the present invention in the following text will be described in detail with reference to some illustrative examples, and particularly, mutual connection and data transfer between the system server and the client devices are provided to implement mutual communication and greatly reduce operation loading of the system server 10.

Specifically, the system server 10 executes a server operation under the X86 windows operation system for linking to the communication network 20 through a communication protocol of transmission control protocol/internet protocol (abbreviated as TCP/IP). Also, each of the client devices 30 is provided with an ARM-based processor as a processing core, and runs a client operation under the android operation system for linking to the communication network 20 through the TCP/IP communication protocol.

Figure 2:
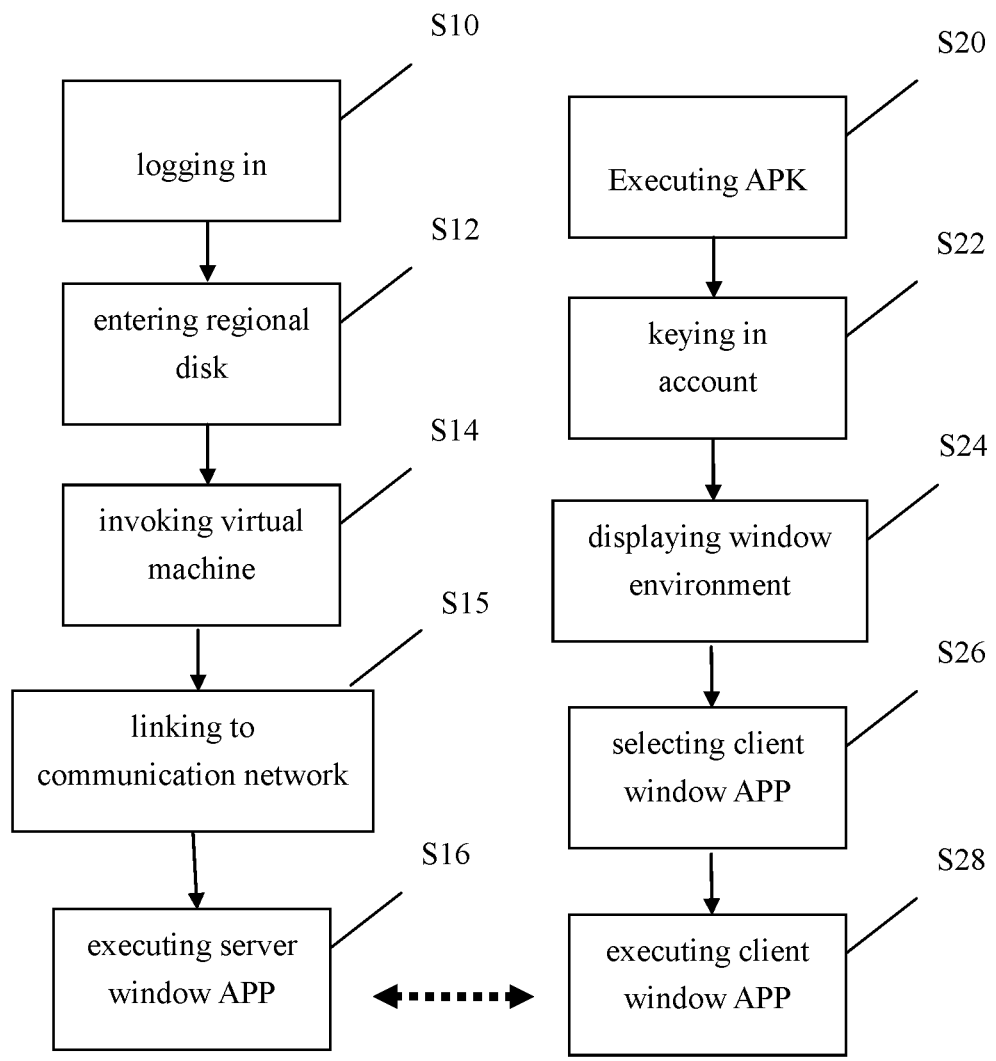
FIG. 2 is a flowchart showing the operation of the system server and the client devices in the system interfacing architecture of the present invention.

Further refer to FIG. 2 showing the operation flow of the system server 10 and the client devices 30 in the system interfacing architecture of the present invention. As shown in FIG. 2, the server operation comprises the sequential steps S10, S12, S15, S14, and S16. More specifically, a superuser logs in the system server 10 in the step S10, and enters regional disk of the system server 10 in the step S12. Then, a virtual machine 12 included in the system server 10 is invoked and hooked up with the X86 windows operation system in the step S14, and further connected to the communication network 20 via the TCP/IP communication protocol in the step S15. Finally, the virtual machine 12 executes a server window application like a server gamble application for a gamble game in the step S16.

Furthermore, the client application comprises the sequential steps S20, S22, S24, S26, and S28. In the step S20, a specific android application package (APK) under the android operation system is executed, and in the step S22, the user of the client device 30 keys in an account number for logging in. Then, a window environment is turned on and displayed in the step S24. The user selects a client window application in the window environment in the step S26, and finally, the client window application is performed to implement a mutual operation in the step S28, so as to communicate with the system server 10 running the server window application through the communication network 20 for mutually transfer data or information.

It should be noted that the client device 30 implements the mutual operation with the system server 10 running the server window application by means of running the client window application, and particularly, a handshake mechanism is used for mutual communication between the client device 30 and the system server 10.

For example, the server window application of the system server 10 is a server gamble application, and the client window application is a client gamble application for the user of the client device 30 to play a gamble game.

More specifically, the system server 10 in the mutual operation generates an original server data, compresses the original server data to form a compressed server data, and transfers the compressed server data to the client device 30 through the communication network 20, and the client device 30 then receives and decompresses the compressed server data to recover and obtain the original server data generated by the system server 10.

Similarly, the client device 30 in the mutual operation generates an original client data, compresses the original client data to form a compressed client data, and transfers the compressed client data to the system server 10 through the communication network 20, and then, the system server 10 receives and decompresses the compressed client data to recover and obtain the original client data generated by the client device 30.

Overall speaking, the system interfacing architecture of the present invention can greatly improve whole system operation efficiency of the gamble game in actual applications, particularly by means of reducing the loading of the system server. Each user in the gamble game readily employs the client device running the android OS like a smart phone to remotely connect the system server of the gamble firm running the X86 windows OS, and the client device executes the client window application to hook up and communicate with the system server.

As the mobile phone gets more excellent performance, the client window application under execution will not obviously slow down the operation of the mobile phone. For the system server serving millions of the client devices at the same, considerable loading is reduced by the present invention. Or alternatively, the task of data conversion for the different OS platforms, which is processed by the system server in the prior arts, is shifted to the individual mobile phones in the present invention.

In other words, the present invention employs the virtual machine to execute the server window application, and the client device is configured to execute the client window application for serving as a data conversion mechanism between the android OS and the X86 windows OS so as to achieve mutual communication across the different OS platforms.

From the above mention, the primary feature of the present invention is that the specific system interfacing architecture is provided for the server/client running the X86 windows OS and the android OS, and the loading of the system server is reduced to increase efficiency of the whole mutual operation so as to implement smooth coalescence and integration. In particular, the X86 windows OS of the system server is hooked up with only one virtual machine, and the client devices (like 256 client devices) are linked to the virtual machine through TCP/IP across the network. Further, the system server and the client devices perform the mutual operation by executing the server window application and the client window application, respectively.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A system interfacing architecture, comprising: a communication network implemented by a wireless network or a wire network;
- a system server executing a server operation under a X86 windows operation system for linking to the communication network through a communication protocol of transmission control protocol/internet protocol (TCP/IP); and
- a plurality of client devices, each provided with an ARM-based processor, executing a client operation under an android operation system for linking to the communication network through the TCP/IP communication protocol,
- wherein the server operation comprises steps of a super-user of the system server logging in, entering a regional disk of the system server, invoking a virtual machine included in the system server to hook up the X86 windows operation system, the virtual machine linking to the network via the TCP/IP, and executing a server window application, and the client operation includes steps of executing a specific android application package (APK) under the android operation system, a user of the client device keying in an account number for logging in, turning on and displaying a window environment, the user selecting a client window application in the window environment, and then performing the client window application to implement a mutual operation with the system server running the server window application through the communication network for mutually transfer data or information; and
- wherein each client device is configured to execute a corresponding client window application for serving as a data conversion mechanism between the android operating system and the X86 windows operation system and shifting the task of data conversion to the client device;
- wherein the server window application is a server gamble application, and the client window application is a client gamble application for a user to play a gamble game;
- and wherein the client device in the mutual operation generates an original client data, compresses the original client data to form a compressed client data, and transfers the compressed client data to the system server through the communication network, and the system server receives and decompresses the compressed client data to recover and obtain the original client data generated by the client device.

2. The system interfacing architecture as claimed in claim 1, wherein the client device is implemented by a mobile phone, a tablet computer, or a terminal running the android operation system.

3. The system interfacing architecture as claimed in claim 1, wherein the client device and the system server perform mutual communication through a handshake mechanism.

4. The system interfacing architecture as claimed in claim 1, wherein the system server in the mutual operation generates an original server data, compresses the original server data to form a compressed server data, and transfers the compressed server data to the client device through the communication network, and the client device receives and decompresses the compressed server data to recover and obtain the original server data generated by the system server.

* * * * *